Feb. 3, 1970

B. A. NIELSEN ET AL 3,493,852

INSTRUMENT FOR MEASURING NONLINEARITY OF
ELECTRICAL COMPONENTS WITH A SELECTIVE
HARMONIC VOLTAGE MEASURING MEANS

Filed Sept. 28, 1965

INVENTORS
B. A. NIELSEN
S. P. STRANDDORF
by McDougall, Hersh + Scott
Att'ys

United States Patent Office 3,493,852
Patented Feb. 3, 1970

3,493,852
INSTRUMENT FOR MEASURING NONLINEARITY OF ELECTRICAL COMPONENTS WITH A SELECTIVE HARMONIC VOLTAGE MEASURING MEANS
Boerge Aagaard Nielsen, 9 Bakkedal, Hellerup, and Soren Peter Stranddorf, 1 Baunevang, both of Vaerlose, Denmark
Filed Sept. 28, 1965, Ser. No. 490,819
Claims priority, application Denmark, Apr. 23, 1965, 2,058/65
Int. Cl. G01r 27/00, 23/00, 15/10
U.S. Cl. 324—57        13 Claims

ABSTRACT OF THE DISCLOSURE

An instrument for measuring nonlinearity in electrical components comprising a generator and a voltmeter, the generator being adapted to produce sinusoidal electromotive force of fundamental frequency $f_1$ for application to a component during testing, and the voltmeter being adapted to measure the $n$th harmonic voltage developed across the component depending upon the nonlinearity of the component. An impedance transforming network is attached between the component being tested and the generator and voltmeter.

---

This invention relates to an instrument for measuring the nonlinearity electrical components, whereby the suitability of the components for various applications can be determined.

In the system of the invention, the component to be measured is coupled to the instrument by means of an impedance-transforming network. The component may comprise, for instance, a resistor, a capacitor, or an inductor. The instrument employed includes a generator adapted to apply a very pure sinusoidal electromotive force of a fundamental frequency $f_1$ to the component under test. A selective voltmeter for measuring the $n$th harmonic of frequency $n \cdot f_1$ as developed across the component on account of its non-linearity is also included.

One drawback of all hitherto known measuring instruments of similar design is the fact that the impedance range for the electrical component whose non-linearity is to be measured is fairly limited. The reason for this is that a satisfactory signal-to-noise ratio is obtainable only in a rather narrow impedance range of the component when small $n$th harmonic voltages are measured. Another drawback of the known instruments is that the transferable power from generator to component depends largely on the numerical value of the impedance of the component. In actual practice this sets fairly narrow limits to the impedance range within which the full power of the generator can be delivered to the component.

It is an object of this invention to provide an instrument capable of overcoming the disadvantages encountered with instruments of the type previously employed for measuring non-linearity in electrical components.

It is a more particular object of this invention to provide an instrument of the type described which includes a generator and voltmeter to be employed in a known manner, and which further includes an impedance-transforming network employed for connecting an electrical component to the generator and voltmeter combination.

Figure 1:
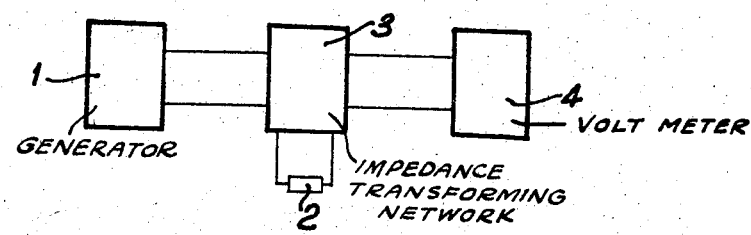
Figure 2:
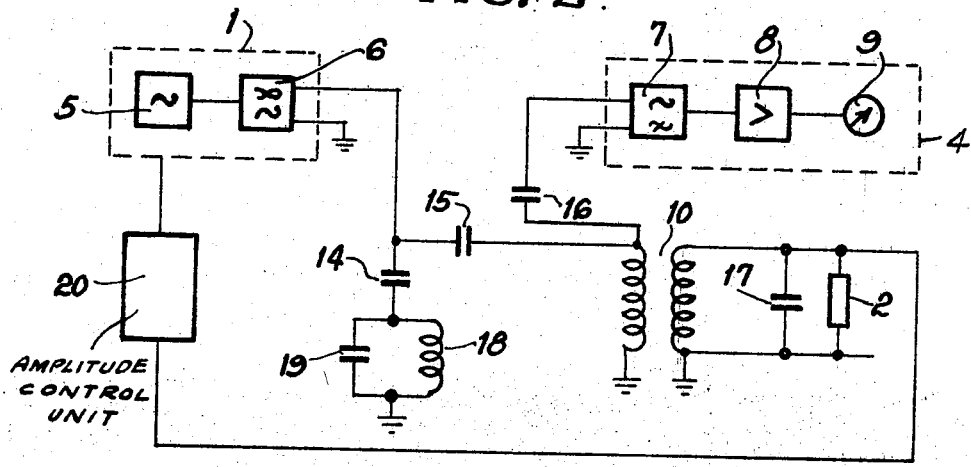
Figure 3:
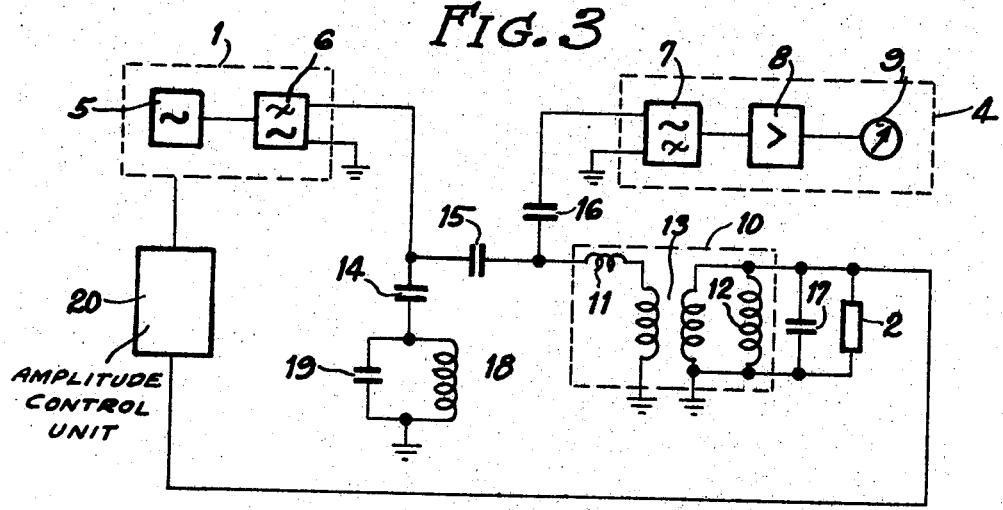

These and other objects of this invention will appear hereinafter and for purposes of illustration but not of limitation, specific embodiments of the invention are shown in the accompanying drawings in which:

FIGURE 1 comprises a block diagram of a instrument characterized by the features of this invention;

FIGURE 2 comprises a circuit diagram particularly illustrating an impedance-transforming network including a transformer in accordance with the principals of this invention; and FIGURE 3 illustrates a circuit diagram generally corresponding to the diagram of FIGURE 2 and including a modified transformer arrangement.

This arrangement of the invention is designed to insure that the impedance of the component to be measured is transformed to a magnitude at which the signal-to-noise ratio during the measurement is more favorable. Accordingly, appreciably smaller values of nonlinearity can be measured than is possible with the instruments of known design. The invention also provides for a considerable extension of the impedance range within which the full power of the generator can be applied to the component.

According to one embodiment of the invention, the electrical component to be measured is coupled to the instrument by means of two transformers, one of which connects the component to the generator of the instrument, while the other connects the component to the selective voltmeter of the instrument. This arrangement insures a matching of the power transfer from the generator to the component which can be made independently of the matching that is carried out between the component and the voltmeter to obtain an optimal signal-to-noise ratio. This is particularly important when measuring the non-linearity of such components as capacitors and inductors, the impedances of which are frequency-dependent. Where the impedances of a capacitor and an inductor are equal at the fundamental frequency $f_1$ a ratio of $1/n^2$ between the impedances of said components occurs at the $n$th harmonic for frequency $n \cdot f_1$. In order to obtain the optimal signal-to-noise ratio for both types of components when their impedances at the fundamental frequency $f_1$ are equal, it is therefore necessary to adjust the impedance transformation ratio in the transformer that connects the component to the voltmeter in accordance with the above mentioned impedance ratio.

According to a different embodiment of the invention, the component is coupled to the instrument through a single transformer. Obviously, all the advantages gained by using two mutually independent transformers are not obtained from this system, but on the other hand, the arrangement reduces expenses, inasmuch as the transformers used are relatively bulky and expensive. If the instrument is used almost exclusively for measuring the nonlinearity of resistors, the use of only one transformer will adequately fulfill the scope of the invention.

According to one aspect of the present invention, it is advantageous if the transformers are built-up of non-magnetizable material, since this insures a very small nonlinearity in the transformer to the extent that it will have no influence on the accuracy of the measurements made, even when measuring components having very slight nonlinearity.

A particularly significant embodiment of the invention provides for the use of a capacitor inserted in the lead between the voltmeter and the transformer winding facing the voltmeter, or in the lead between the component and the transformer winding facing the component. In any case, the capacitance of the said capacitor has a value such that the series resonance occurs between the capacitor and the stray self-inductance of the said transformer at frequency $n \cdot f_1$. The deleterious effect of stray self-inductance on the accurate measurements of the $n$th harmonic is eliminated with this arrangement.

In another embodiment of the invention, a capacitor is placed in parallel across the transformer winding facing the voltmeter or in parallel across the transformer winding facing the component. Alternatively, the capacitor is placed in parallel across a tap of the transformer winding.

The capacitance of such a capacitor will have a value such that parallel resonance occurs between the capacitor and the main self-inductance of the transformer at the frequency $n \cdot f_1$. This arrangement insures that the shunt effect on the component, caused by a relatively small main self-inductance in the transformer and otherwise so harmful to the measuring accuracy, is eliminated at the frequency $n \cdot f_1$.

According to the invention, it may also be advantageous to insert a capacitor in the lead between the generator and the transformer winding that faces the generator, or in the lead between the component and the transformer winding that faces the component. The capacitance of the capacitors is of an order such that series resonance between the capacitor and the stray self-inductance of the transformer occurs at frequency $f_1$. In this case, the harmful influence of the stray self-inductance upon the power transfer from generator to component is eliminated at the fundamental frequency $f_1$.

According to the invention, a network can be placed in parallel across the transformer winding that faces the generator, or in parallel across the transformer winding that faces the component. Where desired, the network can be placed in parallel across a tap of the transformer winding. The said network consists of a capacitor placed in series with a parallel resonance circuit that is tuned to frequency $n \cdot f_1$, and having such values of the capacitances and the self-inductances occurring in the network, that the said network at frequency $f_1$ functions as a capacitor with a capacitance of an order such that this, in conjunction with any other capacitance occurring in parallel across the main self-inductance of the transformer, will provide parallel resonance with the main self-inductance at frequency $f_1$. With this arrangement, the shunt effect on the component which is caused by a small main self-inductance in the transformer, and which is deleterious to the power transfer, is eliminated at fundamental frequency $f_1$.

In another suitable embodiment of the invention, the voltage of frequency $f_1$ occurring across the component, is conducted to an automatic amplitude control unit so designed as to control the output voltage of the generator in such a manner that compensation is obtained for the ohmic voltage drop occurring in the transformer through which the component is coupled to the generator. This insures that the voltage of frequency $f_1$, which is impressed across the component, is kept constant despite variations in the impedance of the component, provided that the generator is not overloaded.

As indicated, it is also an object of the invention to provide improvements in known measuring instruments, especially with reference to obtaining simpler operation in order to render the measuring instruments more suitable for production testing. Since the nonlinearity of a batch of components often varies considerably from specimen to specimen, it is necessary when the known measuring instruments are employed in production control, to make frequent adjustments of the stepwise variable amplification of the selective voltmeter, so that the value measured falls within the scale range of the voltmeter.

The instant invention avoids this disadvantage inasmuch as the selective voltmeter, which measures the $n$th harmonic of the frequency $n \cdot f_1$ that occurs across the component because of its nonlinearity, is constructed with a logarithmic characteristic, so that the meter scale of the voltmeter has a range greater than 30 db, a linear db-scale thus being obtained. This provides for an extremely high operating speed, since in actual practice it will be unnecessary to adjust the amplification of the voltmeter, even when a great number of components are tested, as the scale of the voltmeter can be adapted to cover a range of e.g. 50 db. Because of the logarithmic characteristic of the voltmeter, a linear db scale is obtained. This is very important when auxiliary instruments are to be connected—e.g. for automatic sorting of components, or for automatically recording the statistical distribution of nonlinearity in a batch of components.

A further drawback of measuring instruments of known design is that the adjustment of the voltage of frequency $f_1$, which is impressed across the components, can only be made manually, so that electronic control of the voltage is not possible. This disadvantage is avoided with the instrument of this invention inasmuch as the automatic amplitude control is designated to adjust the output voltage of the generator electronically and in accordance with an external control voltage or control resistor. This arrangement allows for programming and insures that the output voltage of the generator can traverse the range from zero to full voltage, if a saw-tooth voltage is utilized as the control voltage.

By this means, then, it becomes possible with the aid of an oscilloscope, an XY-recorder, or the like, to make a convenient recording of a characteristic showing the relation between the $n$th harmonic voltage, and the voltage impressed across the component. Such a characteristic can otherwise only be recorded through laborious point-by-point measurements.

Generally speaking, the instrument of this invention is designed for measuring nonlinearity in electrical components of the type including resistors, capacitors and inductors. The instrument includes a generator and selective voltmeter means with the component to be tested being connected therebetween. The generator is adapted to produce a very pure sinusoidal electromotive force of fundamental frequency $f_1$ whereby a voltage with a fundamental frequency $f_1$ is applied across the component during testing. The voltmeter is adapted to measure the $n$th harmonic voltage with frequency $n \cdot f_1$ which is developed across the component in accordance with the nonlinearity of the component. To this extent, the instrument of this invention is of known design as illustrated by the disclosure in Canadian Patent No. 656,622 issued Jan. 29, 1963.

The specific improvement of this invention involves the use of an impedance transforming network in the instrument. This network serves as the means for connecting the component to be tested to the generator and voltmeter referred to. It is the particular combination including the impedance transforming network which provides the advantages of this invention.

The drawings illustrate a generator 1, with a very pure sinusoidal electromotive force of a fundamental frequency $f_1$. By means of an impedance transforming network 3, a voltage of fundamental frequency $f_1$ is impressed upon a component 2 whose nonlinearity is to be measured. If nonlinearity exists in the component 2, harmonic voltages will appear across its terminals. The $n$th harmonic voltage is measured by means of a selective voltmeter 4 in conjunction with the impedance transforming network 3.

In FIGURES 2 and 3, the generator 1 is outlined as a dotted block surrounding the generator proper 5 and a low-pass filter 6 in which the generator voltage is purified of harmonic voltages. The selective voltmeter 4 is outlined as a dotted block surrounding a high-pass filter 7, an amplifier 8, and a meter instrument 9.

According to one embodiment of the invention, as illustrated in FIGURES 2 and 3, the impedance transforming network is executed as a transformer 10 which consists of two coupled coils. This may comprise a so-called air-cored transformer constructed without the use of a magnetizable material, or any other material that is capable of introducing nonlinearity. The air-cored transformer 10 is shown in FIGURE 3 as a dotted block that encompasses the equivalent diagram of the transformer, which in turn consists of a stray self-inductance 11, a main self-inductance 12, and an ideal transformer 13. Due to the relatively great stray self-inductance 11 and the relatively small main self-inductance 12 inside the air-cored transformer 10, the capacitors 14, 15, 16, 17, and a resonance circuit consisting of a self-inductance coil 18 and a capacitor 19, have had to be included in order to allow for the use of an air-cored transformer in the instrument as invented.

The significance of the described components can be appreciated by considering the following description of their operation. At frequency $n \cdot f_1$, the capacitor 16 will be in series resonance with the stray self-inductance 11 such that the voltmeter 4 may be assumed to be directly connected to the ideal transformer 13. The capacitor 17 will be in parallel resonance with the main self-inductance 12 such that the latter does not load the component 2. The network consisting of the capacitor 14 and the resonance circuit 18, 19, will have no influence on the aforementioned parallel resonance inasmuch as the resonance circuit 18, 19, is tuned to parallel resonance at the frequency $n \cdot f_1$. Nor will the capacitor 15 influence the said parallel resonance, since the output impedance of the low-pass filter 6, that purifies the generator voltage of harmonic voltages, is very high at the frequency $n \cdot f_1$.

At frequency $f_1$, the capacitor 15 is in series resonance with the stray self-inductance 11 such that the generator 1 may be assumed to be directly connected to the ideal transformer 13. The impedance network, that is made up of the capacitor 14 and the resonance circuit 18, 19, has been so dimensioned that at frequency $f_1$, it functions as a capacitor which, together with the capacitor 17, is in parallel resonance with the main self-inductance 12 such that the latter does not load the component 2. The input impedance of the high-pass filter 7 is very high at frequency $f_1$, and the capacitor 16 will have no influence on the said parallel resonance.

When the above mentioned measures have been adopted, the actual air-cored transformer 10 will in the main behave as an ideal transformer towards the fundamental frequency as well as towards the $n$th harmonic, inasmuch as the deleterious effect of the stray self-inductance 11 and the main self-inductance 12 is eliminated by way of the resonance effect produced.

In the above mentioned description, the losses in the air-cored transformer 10 have been disregarded. The losses can be equalized by a resistor (not shown) in series with the stray self-inductance 11, and a second resistor (not shown) in parallel with the main self-inductance 12. When the impedance of the component 2 decreases, the resistor in series with the stray self-inductance 11 will cause a substantial drop in voltage across the component 2. This drawback has been overcome in an instrument according to the present invention by the introduction of a regulating loop which senses the voltage present across the component 2; and which by means of an automatic amplitude control unit 20 controls the amplitude of the voltage from the generator 1 such that the said voltage of frequency $f_1$ across the component 2 is kept constant, irrespective of variations in the component's impedance, and provided that the generator 1 is not overloaded.

Such measures insure that the actual air-cored transformer 10 acts as a truly ideal transformer, even towards components 2 having a very small impedance.

In the above mentioned description of the selective voltmeter 4, no fixed characteristic has been set for the amplifier 8. The amplifier 8 is so designed that it is possible by means of a switch (not shown) to select between a linear characteristic and a logarithmic characteristic. The indicating meter 9 will thus have a linear voltage scale in one case, a linear db scale in the other.

Electronic adjustment of the output voltage from the generator 1 is accomplished by applying an external control voltage to the automatic control unit 20.

It will be understood that various changes and modifications may be made in the instrument described herein which provide the characteristics of this invention without departing from the spirit thereof.

That which is claimed is:

1. An instrument for measuring nonlinearity in electrical components of the type including resistors, capacitors and inductors, said instrument including a generator and a voltmeter, said generator being adapted to produce a very pure sinusoidal electromotive force of fundamental frequency $f_1$ whereby a voltage with a fundamental frequency $f_1$ is applied to the components during testing, said voltmeter including means whereby it measures only the $n^{\text{th}}$ harmonic voltage with frequency $n \cdot f_1$ as developed across the components in accordance with the nonlinearity of the component, and an impedance transforming network in said instrument, said impedance transforming network including at least one transformer built up of nonmagnetizable material, connecting leads for attaching said generator and said voltmeter to a first winding of said transformer in said impedance-transforming network, and connecting leads for attaching a component to a second winding of said transformer in said impedance-transforming network.

2. An instrument according to claim 1 including an automatic amplitude control unit connected to the component and said generator, said automatic amplitude control unit including means responsive to the voltage of frequency $f_1$ occurring across the component and means to control the output voltage of said generator in such a manner that compensation is obtained for the ohmic voltage drop occurring in the transformer through which the component is coupled to the generator.

3. An instrument according to claim 1 wherein the selective voltmeter, that measures the $n^{\text{th}}$ harmonic with frequency $n \cdot f_1$ occurring across the component because of its nonlinearity, is designed with a logarithmic characteristic, so that the scale of the indicating meter pertaining to the voltmeter has a range greater than 30 db, a linear db scale being obtained.

4. An instrument according to claim 1 wherein an automatic amplitude control is connected to the component and to said generator to adjust the output voltage of the generator electronically and in accordance with an external control voltage or control resistor.

5. An instrument according to claim 1 wherein a capacitor is inserted in the connecting lead between the voltmeter and the respective winding of the transformer of the impedance-transforming network connected to the voltmeter, said capacitor having a capacitance of such value that at the frequency $n \cdot f_1$, there is a series resonance between the capacitor and the stray self-inductance of the transformer.

6. An instrument according to claim 1 wherein a capacitor is inserted in the connecting lead between the component being tested and the respective winding of the transformer of the impedance-transforming network connected to the component, said capacitor having a capacitance of such value that at the frequency $n \cdot f_1$, there is series resonance between the capacitor and the stray self-inductance of the transformer.

7. An instrument according to claim 1 wherein a capacitor is placed in parallel across the respective winding of the transformer of the impedance-transforming network connected to the voltmeter, said capacitor having a capacitance such that at the frequency $n \cdot f_1$, there is parallel resonance between the capacitor and the main self-inductance of the transformer.

8. An instrument according to claim 1 wherein a capacitor is placed in parallel across the respective winding of the transformer of the impedance-transforming network connected to the component, said capacitor having a capacitance such that at the frequency $n \cdot f_1$, there is parallel resonance between the capacitor and the main self-inductance of the transformer.

9. An instrument according to claim 8 wherein a second capacitor is placed in parallel across the respective winding of the transformer of the impedance-transforming network connected to the voltmeter, the second capacitor having a capacitance of such value that at the frequency $n \cdot f_1$, there is parallel resonance between the joint capacitance of both capacitors and the main self-inductance of the transformer.

10. An instrument according to claim 1 wherein a capacitor is inserted in the connecting lead between the generator and the respective winding of the transformer of the impedance-transforming network connected thereto, the capacitance of said capacitor having a value such that at the frequency $f_1$, there is series resonance between the capacitor and the stray self-inductance of the transformer.

11. An instrument according to claim 1 wherein a capacitor is inserted in the connecting lead between the component and the respective winding of the transformer of the impedance-transforming network connected to the component, the capacitance of said capacitor having a value such that at the frequency $f_1$, there is series resonance between the capacitor and the stray self-inductance of the transformer.

12. An instrument according to claim 1 wherein a network is placed in parallel across the respective winding of the transformer of the impedance-transforming network connected to the generator, said network consisting of a capacitor placed in series with a parallel resonance circuit tuned to the frequency $n \cdot f_1$, the values of the capacitances and self-inductance incorporated in the network being such that the network at the frequency $f_1$ acts as a capacitor characterized by a capacitance which, together with any other available capacitance in parallel with the main self-inductance of the transformer, is in parallel resonance with said main self-inductance at the frequency $f_1$.

13. An instrument according to claim 1 wherein a network is placed in parallel across the respective winding of the transformer of the impedance-transforming network connected to the component, said network consisting of a capacitor placed in series with a parallel resonance circuit tuned to the frequency $n \cdot f_1$, the values of the capacitances and self-inductance incorporated in the network being such that the network at the frequency $f_1$ acts as a capacitor characterized by a capacitance which, together with any other available capacitance in parallel with the main self-inductance of the transformer, is in parallel resonance with said main self-inductance at the frequency $f_1$.

References Cited

UNITED STATES PATENTS

| | | | |
|---|---|---|---|
| 2,145,483 | 1/1939 | Jacob | 324—57 |
| 2,476,992 | 7/1949 | Miller | 324—57 |
| 2,626,981 | 1/1953 | Shiepe | 324—57 |
| 2,762,971 | 9/1956 | Parker | 324—57 |
| 2,772,397 | 11/1956 | Rich | 324—132 X |
| 2,782,366 | 2/1957 | Wall | 324—57 |
| 2,470,443 | 5/1949 | Mittlemann | 333—32 XR |
| 2,681,434 | 6/1954 | Wheeler | 324—81 |
| 3,217,247 | 11/1965 | Taber | 324—57 |

FOREIGN PATENTS 941,077  11/1963  Great Britain.

EDWARD E. KUBASIEWICZ, Primary Examiner

U.S. Cl. X.R.

324—81, 132